June 29, 1965     J. H. SHEPLEY     3,191,372

PICK-UP

Filed April 29, 1964

INVENTOR.
JOHN H. SHEPLEY
BY
*Joseph A. Brown*
ATTORNEY

United States Patent Office 3,191,372
Patented June 29, 1965

3,191,372
PICK-UP
John H. Shepley, Lancaster, Pa., assignor to Sperry Rand Corporation, New Holland, Pa., a corporation of Delaware
Filed Apr. 29, 1964, Ser. No. 363,425
4 Claims. (Cl. 56—364)

This invention relates to pick-up structures for hay balers, forage harvesters and other agricultural implements. More specifically, the invention relates to a pick-up particularly adapted for use in harvesting short hay crops.

In areas which have been subjected to drought and in unirrigated arid sections of the country where hay crops are sparse, the windrows of hay to be picked up are thin. As the result, they are difficult to elevate cleanly. A greater proportion of hay is missed when the crop windrows are thin than when they are of substantial size. This is a considerable problem because farmers who have light hay crops want to gather every possible portion of the crop and keep losses to a minimum.

One object of this invention is to provide an improved crop pick-up which will effectively elevate hay from the ground even when the windrows are thin.

Another object of this invention is to provide a crop pick-up which can be positioned to operate in close proximity to the ground without damage from stones and the like.

Another object of this invention is to provide a crop pick-up of the characted described having resilient fingers which operate across the full axial length of the pick-up, there being no spaces between the paths of travel of the fingers.

A further object of this invention is to provide a large diameter main crop pick-up on an implement and a much smaller diameter auxiliary pick-up directly in front of the main pick-up, and both being cooperative in elevating crop material.

A still further object of this invention is to provide an auxiliary crop pick-up which may be manufactured at low cost.

Other objects of this invention will be apparent hereinafter from the specification and from the recital in the appended claims.

Figure 1:
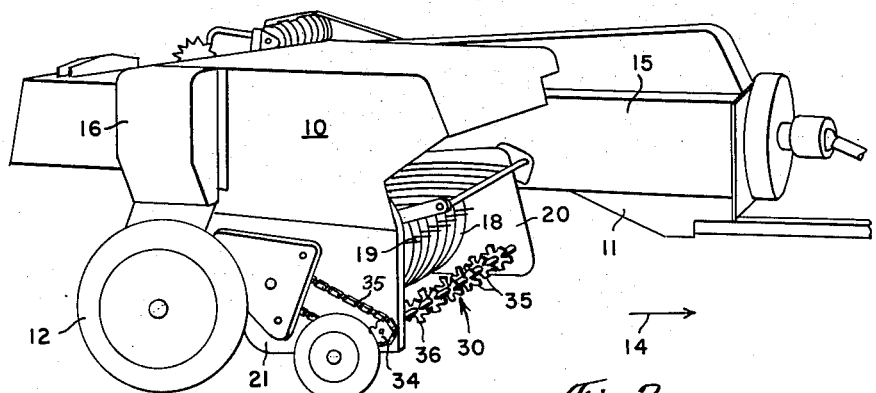
FIG. 1 is a perspective view looking from the right front of a hay baler and showing a sparse material hay pick-up constructed according to this invention.

Referring now to the drawings by numerals of reference, and particularly to FIG. 1, 10 denotes generally a hay baler having a frame structure 11 supported on ground wheel means 12. The baler travels in a forward direction as indicated by the arrow 14. The baler has a fore-and-aft extending bale case 15 and a laterally projecting housing 16 which contains a feeder mechanism not shown. The baler has a large diameter rearwardly located main pick-up 18 having outwardly projecting pick-up fingers 19 rotatable to elevate material and deliver it to housing 16. The main pick-up 18 is supported on laterally spaced side plates 20 and 21 carried on the baler frame 11. When viewed as shown in FIG. 1, fingers 19 travel in a counterclockwise direction. Baler 10 and the main pick-up may be constructed as shown in detail in Patent No. 2,950,670.

To assist the main baler pick-up 18 in its crop elevating operations, an auxiliary pick-up 30 is provided. The auxiliary pick-up is located close to the ground directly in front of the main pick-up and comprises a transversely extending shaft 31 (FIG. 2) rotatably journalled in side plates 20 and 21. At one end 32 of the shaft a sprocket 34 is provided and driven by an endless chain 33 to rotate pick-up 30 in a counterclockwise direction when viewed as shown in FIG. 1.

For engaging the crop material, pick-up 30 is provided with flat, rubber discs 35 which are mounted on shaft 31 to extend in spaced parallel vertical planes diagonal to the shaft axis. All of the discs are of the same configuration and diameter. Each disc 35 has a plurality of radially extending axially spaced fingers 36, as shown best in FIG. 3. Each finger has an arcuate radial outer end 38 generally concentric to the axis of shaft 31. The discs are uniformly spaced from each other by spacer sleeves 39 which surround shaft 31 and have axial ends 40 and 41 which engage side faces 42 and 43 of the discs. The engagement of the sleeves with sides of the discs increases the support and stability of the discs. Threaded nut means 44 produces a clamping action on the sleeves and forces them axially to provide a firm clamping action on the discs.

Figure 2:
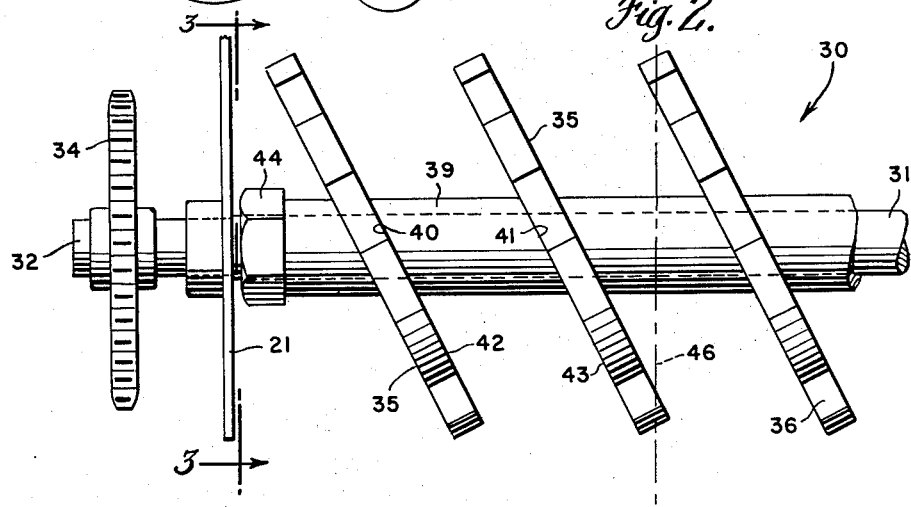
FIG. 2 is an enlarged fragmentary front view of one end of the forward pick-up.

As shown best in FIG. 2, the axial spacing of the discs to each other relative to their diagonal disposition is such that each adjacent pair of discs overlaps as indicated by the fore-and-aft dotted line 46. This overlapping provides a crop gathering action along the full axial length of the auxiliary pick-up 30.

In operation, the baler travels forwardly and the pick-up 18 and auxiliary pick-up 30 rotate in counterclockwise directions. The fingers 36 on the flexible discs 35 engage the thin material on the ground and elevate it. Such material is passed over the top of auxiliary pick-up 30 and delivered to the main pick-up 18 for engagement by the fingers 19 for conveyance into the machine. Since the discs 35 are flexible, shaft 31 is disposed close to the ground so that the peripheries of the discs will sweep low and gather all of the material. If a stone or other obstacle is encountered, the fingers will flex and allow the stone or object to pass through the pick-up without damage to the structure. The main pick-up 18 has a high enough elevation to allow normal stones to pass beneath it.

Figure 3:
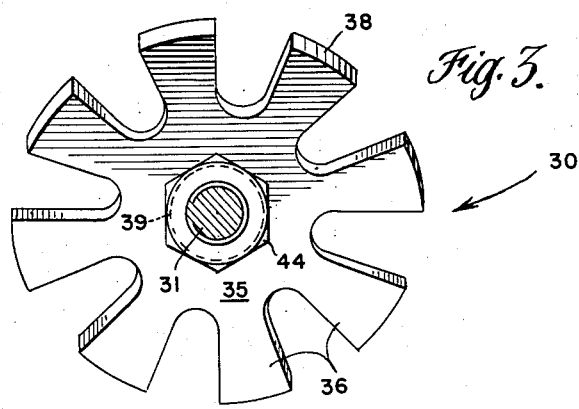
FIG. 3 is a section taken on the line 3—3 of FIG. 2 looking in the direction of the arrows.

As shown in FIG. 3, fingers 36 have a substantial radial extension and the inner ends of the fingers are spaced outwardly from the spacer sleeves 39. With this construction, the discs are held firmly in place. However, the fingers 36 are allowed substantial flexibility and the arcuate outer ends 38 of the fingers produce a clean sweeping action over the ground.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A pick-up structure for lifting crop material from the ground for delivery into a harvester comprising a frame structure wheel supported for travel in a forward direction, a main pick-up reel carried on said frame and extending transversely of the direction of travel, said pick-up being generally cylindrical and having a plurality of radially outwardly projecting crop engaging tines thereon, and auxiliary rotatable pick-up carried on said frame directly in front of said main pick-up and parallel thereto, said auxiliary pick-up having a diameter substantially smaller than the diameter of the main pick-up and comprising a shaft, a plurality of discs mounted on said shaft in axially spaced relation and extending in parallel vertical planes diagonal to the shaft, said discs overlapping in a direction perpendicular to said shaft and each disc having a plurality of radially extending substantially angularly spaced crop engaging fingers, and said auxiliary pick-up being operative to lift said crop material and pass the material over the auxiliary pick-up and rearwardly and discharge it directly into the path of said main pick-up tines.

2. A pick-up for lifting crop material from the ground as recited in claim 1 wherein spacer sleeves are provided on said shaft between said discs, there being one sleeve between each adjacent pair of discs, said sleeves engaging the sides of the discs.

3. A pick-up for lifting crop material from the ground as recited in claim 2 wherein said disc fingers have inner ends spaced outwardly of the said spacer sleeves.

4. A pick-up for lifting crop material from the ground as recited in claim 1 wherein said crop engaging fingers on said discs have arcuate outer edges generally concentric to said shaft.

References Cited by the Examiner
UNITED STATES PATENTS

| | | | |
|---|---|---|---|
| 2,212,873 | 8/40 | Bobbroff | 56—294 |
| 2,469,580 | 5/49 | Scranton | 56—344 X |
| 2,533,691 | 12/50 | Remonte | 56—294 |
| 2,597,218 | 5/52 | Appel | 171—89 X |
| 2,667,731 | 2/54 | Nerness | 56—372 |
| 2,670,846 | 3/54 | Rienks et al. | 171—133 X |
| 2,699,253 | 1/55 | Miller | 171—133 X |
| 2,993,545 | 7/61 | Hammer et al. | 171—58 |
| 3,084,367 | 4/63 | Radinse | 15—181 |

ABRAHAM G. STONE, *Primary Examiner.*

ANTONIO F. GUIDA, T. GRAHAM CRAVER,
*Examiners.*